United States Patent
Teuling et al.

(10) Patent No.: US 6,218,791 B1
(45) Date of Patent: Apr. 17, 2001

(54) DEFLECTION CORRECTION

(75) Inventors: Dirk J. A. Teuling; Johannes A. C. Misdom; Franky M. M. E. Vaneerdewegh; Johannes L. M. Verhees; Roger P. H. Kennis, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/326,508

(22) Filed: Jun. 4, 1999

(30) Foreign Application Priority Data

Jun. 5, 1998 (EP) .................................................. 98201882

(51) Int. Cl.$^7$ ...................................................... G09G 1/04
(52) U.S. Cl. ............................................ 315/408; 315/371
(58) Field of Search ..................................... 315/364, 374, 315/371, 408, 411, 399

(56) References Cited

U.S. PATENT DOCUMENTS

| | | | |
|---|---|---|---|
| 3,800,181 | * | 3/1974 | Spencer, Jr. ............................. 315/27 |
| 4,254,365 | * | 3/1981 | Knight ................................. 315/371 |
| 4,400,653 | * | 8/1983 | Olmstead ............................. 315/408 |
| 4,423,358 | * | 12/1983 | den Hollander ..................... 315/371 |
| 4,482,846 | * | 11/1984 | Worster ............................... 315/371 |
| 4,625,154 | * | 11/1986 | Willis .................................. 315/371 |
| 4,677,350 | * | 6/1987 | Wharton et al. ...................... 315/371 |
| 4,733,141 | * | 3/1988 | Watanuki .............................. 315/371 |
| 4,906,903 | * | 3/1990 | Ochiai ................................. 315/371 |
| 5,488,272 | * | 1/1996 | Cotton ................................. 315/408 |
| 5,661,375 | | 8/1997 | Haferl ................................. 315/311 |

FOREIGN PATENT DOCUMENTS

| | | | |
|---|---|---|---|
| 0258949B1 | 3/1988 | (EP) | .............................. H04N/3/233 |
| 0490265B1 | 6/1992 | (EP) | .............................. H04N/3/23 |
| 0823812A2 | 2/1998 | (EP) | .............................. H04N/3/233 |

* cited by examiner

Primary Examiner—Don Wong
Assistant Examiner—Hoang Nguyen
(74) Attorney, Agent, or Firm—Edward W. Goodman

(57) ABSTRACT

A deflection circuit includes a deflection correction circuit (Vs) with a controllable active voltage source (Vs) arranged in a loop formed by a deflection coil (Ld), an S-capacitor (Cs), and a flyback capacitor (Cf). The voltage source (Vs) receives a further power supply voltage (Vb2) and a modulating signal (M) to supply a modulating voltage (Vm) varying in response to the modulating signal (M). The active voltage source (Vs) includes a switching element (S2) which is switched on and off with a frequency which is substantially higher than the deflection frequency to to enable waveforms of the modulating voltage (Vm) with a frequency content which is substantially higher than the deflection frequency such that any desired waveform can be generated within the deflection period (Td).

10 Claims, 4 Drawing Sheets

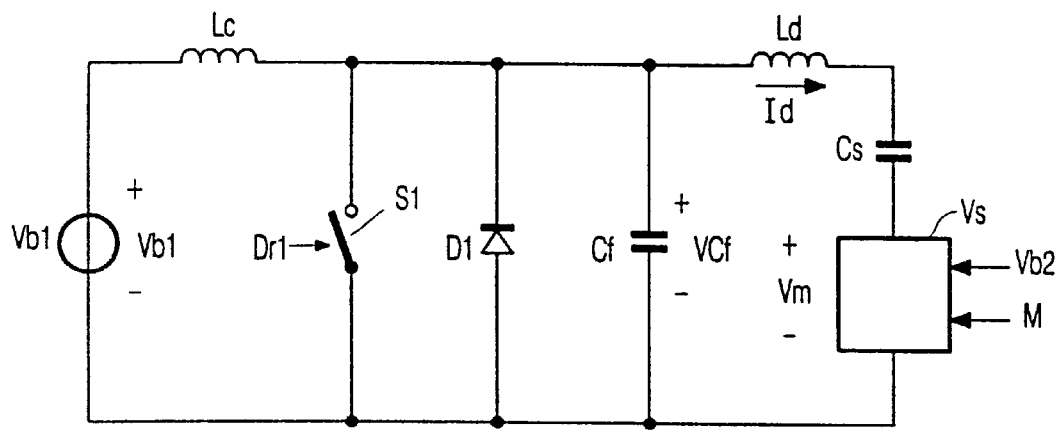
FIG. 1
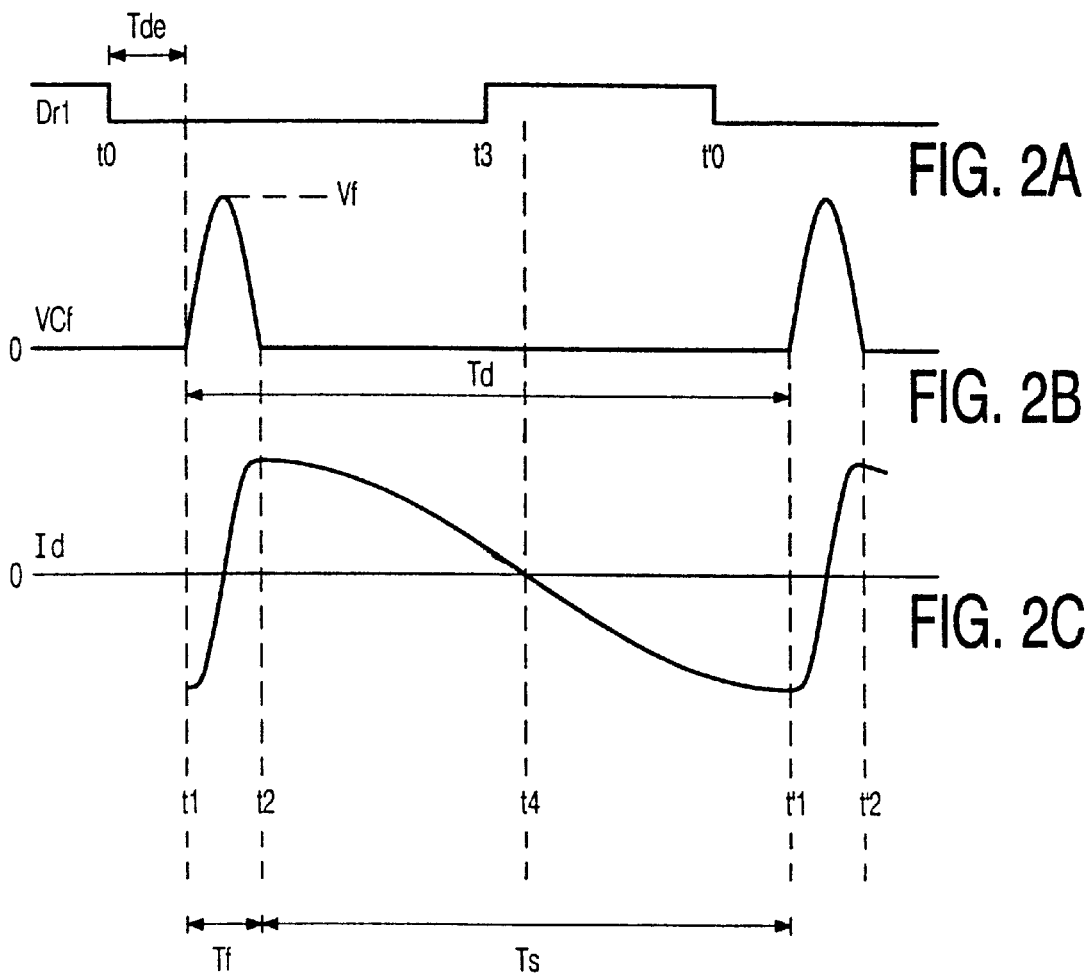
FIG. 2A
FIG. 2B
FIG. 2C

DEFLECTION CORRECTION

BACKGROUND OF THE INVENTION

1. Field of the Invention

The invention relates to a deflection circuit with a deflection correction circuit. The invention further relates to a display apparatus with such a deflection circuit. Such a deflection circuit is particularly suitable for computer monitors or other display apparatuses which have to display information with substantially different line frequencies.

2. Description of the Related Art

In a display apparatus with a cathode ray tube in which an electron beam is deflected, the angle between the electron beam and the screen of the tube varies during scanning. Therefore, the scanning rate has to be corrected as a function of the position of the point where the beam impinges on the screen. This correction is known as "S-correction", because, when the electron beam is deflected by the electromagnetical field generated by a deflection coil, the sawtooth-shaped deflection current flowing through the deflection coil has to be corrected to become S-shaped. The S-correction is obtained by an S-capacitor which is arranged in series with the deflection coil.

In a known line deflection circuit, a power supply voltage is supplied to a series arrangement of a choke and a periodically switched electronic switch. A diode, a flyback capacitor, and a series arrangement of the line deflection coil and the S-capacitor are arranged in parallel with the switch. The diode has a polarity so as to be conductive during at least part of a period during which the switch is non-conductive. After the switch has been switched off, the line deflection coil resonates with the flyback capacitor: during the flyback period a high flyback voltage occurs across the flyback capacitor and the current through the line deflection coil reverses sign. At the end of the flyback period, which is the start of the scan period, the diode becomes conductive and the average voltage built up across the S-capacitor occurs across the line deflection coil to cause the S-corrected sawtooth current to run through the line deflection coil. Before the middle of the scan period, where the deflection current changes sign, the switch has to be closed again to maintain the S-capacitor voltage across the line deflection coil. A line period is defined as the sum of the flyback period and the scan period.

In a display apparatus which has to display display signals with substantially different line periods, it is known to adapt the value of the S-capacitor in dependence on the line period. A number of branches is connected in parallel to the S-capacitor, each branch comprising a switch arranged in series with a capacitor. The correct S-capacitance value is approximated by determining, in response to the detected line frequency, which switches should be opened and which switches should be closed. The switches are opened or closed continuously during the period in time that display signals with a certain line frequency are received.

European Patent Application EP-A-823812 discloses that an adjustable S-correction in a line deflection can be obtained by arranging only one switch in series with an extra capacitor arranged in parallel with the S-capacitor. The amount of S-correction is adapted by controlling the on-time of the switch during a line period. In this way it is possible to gradually adjust, in dependence on the line frequency, the S-correction, the line amplitude, and the inner pincushion correction. The inner pincushion distortion is corrected by varying the amount of S-correction as a function of the vertical position.

It is a drawback of the prior art that the shape of the S-correction waveform is a superposition of two or more different parabola functions. It is thus impossible to generate any given shape of the correction waveform within a scan period without using a large amount of parallel branches. A great flexibility in generating the shape of the correction waveform is required to fit a vast variety of cathode ray tubes, each with their specific requirements with respect to the correction waveforms.

SUMMARY OF THE INVENTION

It is an object of the invention to provide a deflection circuit with a deflection correction circuit which, for a large range of deflection frequencies, is able to modulate the current through the deflection coil with any given shape in a scan period. In this way it is possible to correct, with a very high accuracy and within a large range of deflection amplitudes and deflection frequencies, the inner pincushion distortion (and, hence, the S-distortion) and also the linearity.

To this end, a first aspect of the invention provides a deflection circuit with a deflection correction circuit. A second aspect of the invention provides a display apparatus with such a deflection circuit. Advantageous embodiments of the invention are defined in the dependent claims.

The deflection circuit according to the invention comprises a deflection correction circuit with a controllable active voltage source arranged in the loop formed by the deflection coil, the S-capacitor, and the flyback capacitor. The voltage source receives a further power supply voltage and a modulating signal to supply a modulating voltage varying in response to the modulating signal. The active voltage source is able to generate any desired waveform within a deflection period. During the scan period of the deflection period, the voltage across the deflection coil is determined by a voltage which is the sum of the modulating voltage and the voltage across the S-capacitor. Thus, since the modulating voltage has any given shape within a scan period, the voltage across the deflection coil varies according to the same shape. Consequently, an appropriate modulation of the current through the deflection coil is obtained. The active voltage source comprises a switching element which is switched on and off with a frequency which is substantially higher than the deflection frequency to obtain waveforms of the correction signal with a frequency content which is substantially higher than the deflection frequency, so that any desired waveform can be generated within the scan period. The deflection correction circuit, according to the invention, enables the generation of a gradually adjustable waveform instead of discrete correction steps as is the case if a desired number of S-capacitors are switched in parallel. A user is able to adjust the waveform to obtain a perfect correction without problems.

European Patent Application EP-B-0490265, corresponding to U.S. Pat. No. 5,043,637, EP-B-0490265 discloses an embodiment of the generally used diode modulator circuit. The diode modulator circuit shown comprises a second resonant circuit arranged in series with the first resonant circuit composed of the deflection coil, the S-capacitor, the flyback capacitor and the diode. The second resonant circuit comprises a series arrangement of a modulator coil and a modulator capacitor arranged in parallel with the modulator flyback capacitor and the modulator diode. The operation of the diode modulator circuit is based on the fact that the average voltage across the S-capacitor is varied by modulating the average voltage across the modulator capacitor via a coupling coil connected to the junction of the modulator coil and the modulator capacitor. Due to the essential tuning of the circuit to a frequency, related to the line frequency, it is impossible to generate any given correction waveform in a line period. It should be noted that during the scan period, either the switch or the diode arranged in parallel with the switch are conducting. Consequently, the series arrangement of the deflection coil and the S-capacitor is short-circuited; there is no active voltage source generating a correction current containing frequencies which are much higher than the deflection-current frequencies. Only the S-capacitor is present in series with the deflection coil. The S-capacitor is not an active voltage source, and is only able to generate a low-frequency S-correction current.

As is known, the diode modulator is primarily intended to correct the East-West distortion. A frame-frequent parabolic voltage is supplied to the coupling coil, so that the line amplitude is enlarged in the center of the screen.

Further, due to the tuning, the diode modulator is suitable for one line frequency only. If the diode modulator has to operate over a large line frequency range, the earlier described parallel branches have to be added so as to be arranged in parallel with the S-capacitor.

U.S. Pat. No. 5,661,375 discloses a line deflection circuit with a deflection correction circuit to correct the inner pincushion distortion. The deflection correction circuit modifies the line deflection voltage by supplying a correction current through the S-capacitor to obtain a correction voltage across the S-capacitor. A line-frequency controlled switch generates a modulating voltage across a capacitor. The modulation voltage is supplied as the modulating current to the S-capacitor via a series arrangement of a series coil and a series capacitor. The series coil is adjusted to obtain a resonance frequency with the series capacitor which is slightly lower than two times the line deflection frequency. Fine tuning of the series coil determines the overall S-shaping. Anyhow, the series coil needs to have a quite large value to convert the modulating voltage into the correction current, and to suppress the line-frequent switching frequency of the controlled switch. Consequently, this circuit can only modulate the voltage across the deflection coil with a frequency much lower than the line frequency, which is logical because the circuit is intended to generate an inner pincushion correction which requires a frame-frequent modulation only.

Further, the correction circuit is not suitable for a large range of line deflection frequencies due to the tuned circuits formed by the series coil and the series capacitor, and by the deflection coil, the S-capacitor and the flyback capacitor.

European Patent Application EP-B-0258949, corresponding to U.S. Pat. No. 4,859,915, discloses an alternative solution for correcting the inner pincushion distortion in which the S-capacitor is split into two series arranged S-capacitors. The correction current is generated through one of the S-capacitors, further referred to as added S-capacitor. The correction circuit comprises a first correction circuit which generates a frame-frequency-varying average voltage across the added S-capacitor. This average voltage is the supply voltage for a second correction circuit which supplies a line-frequent sawtooth current to the added S-capacitor. Due to the current correction, also this circuit is unable to vary the correction current fast enough to enable a correction of the deflection voltage with any given shape in a line period. Further, again, the circuits in the second correction circuit are tuned to a frequency related to the line frequency, this is improper if the circuit has to perform corrections over a large range of line frequencies.

In an embodiment of the invention, a modulator capacitor is arranged in series with the S-capacitor, and a-switching element is connected via a modulator coil to the modulator capacitor to generate the modulating voltage across the modulator capacitor. The values of the modulator capacitor and the modulator coil are selected to suppress the switching frequency of the switching element, while they substantially pass a deflection frequency and/or higher harmonics of the deflection frequency.

In another embodiment of the invention, a damping resistor is added to damp oscillations caused by the flyback pulse.

In another embodiment of the invention, a blocking capacitor has been added in series with the damping resistor to prevent DC currents through the modulator coil.

In another embodiment of the invention, a transformer generates a flyback pulse in series with the modulator coil to at least partly compensate the flyback pulse on the flyback capacitor in order to suppress the oscillations caused by the flyback pulse. The compensation of the flyback pulse further decreases the dissipation in the damping resistor.

In another embodiment of the invention, the S-capacitor has a value enabling the correct S-correction to be obtained at a deflection frequency substantially in the middle of the frequency range. Although it is possible to take a very small (cheap) S-capacitor, this would imply a high power supply voltage for the active voltage source and thus a high dissipation therein.

In another embodiment of the invention, the linearity corrector has a value enabling the correct linearity to be obtained at a deflection frequency substantially in the middle of the frequency range. In this way, the power supply voltage for and the dissipation in the active voltage source is low.

In another embodiment of the invention, the linearity is automatically corrected.

These and other aspects of the invention will be apparent from and elucidated with reference to the accompanying drawings.

BRIEF DESCRIPTION OF THE DRAWINGS

In the drawings:

FIG. 1 shows a basic block diagram of a deflection circuit with a deflection correction circuit according to the invention;

FIGS. 2A–2C show waveforms occurring in the deflection circuit of FIG. 1;

DESCRIPTION OF THE PREFERRED EMBODIMENTS

Figure 3:
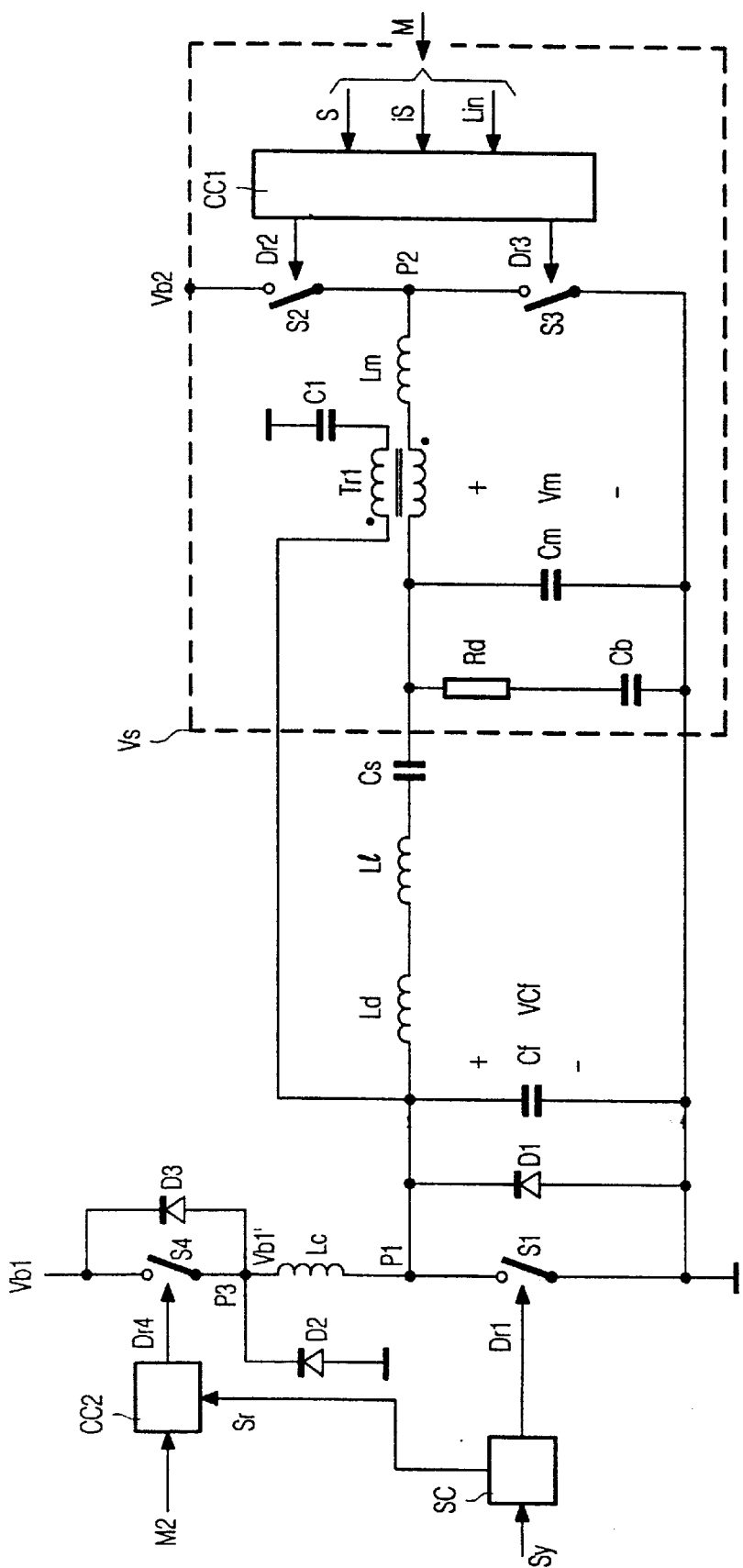
FIG. 3 shows a detailed block diagram of an embodiment of the deflection circuit and the deflection correction circuit according to the invention.

FIG. 1 shows a basic block diagram of a deflection circuit with a deflection correction circuit according to the invention.

In the deflection circuit without the deflection correction circuit Vs, a power supply voltage Vb1 is supplied to a series arrangement of a choke Lc and a periodically switched electronic switch S1. A diode D1 and a flyback capacitor Cf are arranged in parallel with the switch S1. A series arrangement of a deflection coil Ld and an S-capacitor Cs is arranged in parallel with the flyback capacitor Cf. If the voltage source Vb1 has a polarity as indicated by the voltage Vb1, the diode D1 has a cathode connected to the junction of the choke Lc and the switch S1. The on and off periods of the switch S1 are controlled by the drive signal Dr1.

The deflection correction circuit Vs, which comprises a controllable active voltage source Vs, is arranged in the loop formed by the deflection coil Ld, the S-capacitor Cs, and the flyback capacitor Cf. The voltage source Vs receives a further power supply voltage Vb2 and a modulating signal M to supply a modulating voltage Vm varying in response to the modulating signal M. The active voltage source Vs is able to generate any desired waveform within a deflection period Td. In this way, during the scan period Ts when the diode D1 conducts and/or the switch S1 is closed, the voltage across the deflection coil Ld is determined by a voltage which is the sum of the modulating voltage Vm and the voltage across the S-capacitor Cs. By any desired waveform within a deflection period, is meant every practically required waveform in a deflection circuit for a cathode ray tube. Such a waveform comprises frequency components which are much higher than the deflection frequency.

FIGS. 2A–2C show waveforms occurring in the deflection circuit of FIG. 1. FIG. 2A shows the drive signal Dr1 which controls the switch S1. The switch S1 may be a high voltage bipolar transistor or any other suitable semiconductor switching device. FIG. 2B shows the voltage VCf across the flyback capacitor Cf. FIG. 2C shows the deflection current Id through the deflection coil Ld.

The switch S1 is periodically switched on at off with a deflection period Td. At instant t0, the drive signal Dr1 indicates that the high voltage transistor S1 should become non-conducting. After a delay Tde (often referred to as storage time), the high voltage transistor S1 is actually non-conducting and the flyback period Tf starts. The energy in the deflection coil Ld and in the choke Lc is transferred to the flyback capacitor Cf causing a flyback voltage VCf with a high value Vf across it. Next, the energy in the flyback capacitor Cf is transferred to the deflection coil Ld and the choke Lc until the voltage VCf becomes negative at instant t2 and the diode D1 starts conducting. During the flyback period Tf, the deflection current Id through the deflection coil Ld reverses sign. During the scan period Ts, a S-corrected sawtooth deflection current Id is obtained by short-circuiting the series arrangement of the deflection coil Ld and the S-capacitor Cs. When the deflection current Id reverses sign at instant t4 substantially in the middle of the scan period, the diode D1 becomes non-conducting. Therefore, the switch S1 has to be closed at an instant t3 occurring before instant t4. The average voltage across the S-capacitor Cs is substantially equal to the supply voltage Vb1. Within a scan period Ts, the shape of the deflection current Id is corrected by any given shape by adding the controllable active voltage source Vs in series with the S-capacitor.

FIG. 3 shows a detailed block diagram of an embodiment of the deflection circuit and the deflection correction circuit according to the invention. This embodiment shows a line deflection circuit suitable for a large range of line frequencies. The same references as in FIG. 1 denote the same elements which function in a same way.

A DC power supply voltage Vb1 is supplied to a series arrangement of a switch S4, the choke Lc, and the switch S1. Again, both the diode D1 and the flyback capacitor Cf are arranged in parallel with the switch S1. The cathode of the diode D1 is connected to a junction P1 of the switch S1 and the choke Lc, and the anode is connected to ground. A series arrangement of the deflection coil Ld, an optional linearity coil LI, the S-capacitor Cs, and a modulator capacitor Cm is arranged in parallel with the flyback capacitor Cf. The modulating voltage Vm is generated across the modulator capacitor Cm. A series arrangement of a damping resistor Rd and a blocking capacitor Cb is arranged in parallel with the modulator capacitor Cm. A series arrangement of a primary winding of a transformer Tr1 and a capacitor C1 is connected between ground and the junction of the choke Lc and the switch S1. A secondary winding of the transformer Tr1 has an end which is connected to a junction of the modulator capacitor Cm and the S-capacitor Cs, and a further end which is connected to a junction point P2 via a modulator coil Lm. A switch S2 is arranged between a further DC power supply voltage Vb2 and the junction P2. A switch S3 is connected between the junction P2 and ground. A control circuit CC1 receives the modulating signal M to supply drive signals Dr2 and Dr3 to the switches S2 and S3, respectively.

A diode D3 has a cathode connected to the DC power supply Vb1 and an anode connected to a junction P3 of the switch S4 and the choke Lc. A diode D2 has a cathode connected to the junction P3 and an anode connected to ground.

A synchronization circuit SC receives synchronization information Sy from the display information to supply the drive signal Dr1 to the switch S1, and a synchronization reference Sr to a control circuit CC2. The control circuit CC2 further receives a modulating signal M2 to supply a drive signal Dr4 to the switch S4.

The control circuit CC2 switches the switch S4 at the line-frequency with a constant on-time. Consequently, the off-time of the switch S4 varies when the line frequency varies. In this way, the supply voltage Vb1' for the deflection circuit is modulated to obtain a correct line width over a large range of line frequencies. It is further possible to modulate the supply voltage Vb1' with a frame-frequency-varying modulating signal M2 to correct the East-West distortion and other low frequency corrections like keystone and east-west corner corrections.

The switch S1 is controlled by the drive signal Dr1 as elucidated with respect to FIG. 1.

The elements of the active voltage source Vs are within the dashed block denoted by Vs. The modulating voltage Vm is generated across the modulator capacitor Cm. The damping circuit, which comprises the resistor Rd and the capacitor Cb is optional. Also the transformer Tr1 is optional. Both the damping circuit and the transformer Tr1 decrease oscillations in the circuit caused by the rapidly changing voltage VCf during the flyback period Tf. The polarities of the windings of the transformer Tr1, which are denoted by dots, are selected such that substantially no flyback pulse occurs across the modulator coil Lm. The control circuit CC1 converts the modulating signal M into the drive signals Dr2 and Dr3 for periodically switching the switches S2 and S3, respectively. The switches S2 and S3 should not be conductive at the same time. The drive signal Dr3 may be the inverted drive signal Dr2. The period of switching of the switches S2 and S3 has to be selected substantially higher than the line frequency. The values of the modulator capacitor Cm and the modulator coil Lm are selected to suppress the switching frequency of the switches S2 and S3 and to substantially pass the frequencies in the modulating signal M. The modulating signal M may vary to correct for S-distortion, inner S-distortion, and linearity. The modulating signal M may consist of three separate modulating signals S, iS, and Lin-to correct for S-distortion, inner S-distortion, and linearity, respectively. The frequencies in the modulating signal M may comprise the line frequency and several higher harmonics of the line frequency. In principle, it is also possible to correct for line amplitude, East-West distortion, and keystone distortion, but in this case, the DC power supply voltage has to be selected so high that a very high dissipation occurs in the controllable active voltage source Vs.

The conversion of a modulating signal M or M2 with a varying shape into a periodical drive signal Dr2, Dr3 or Dr4 can be performed in many known ways. An example is elucidated with respect to FIGS. 4 and 5A–5C.

For example, in a practical realization the following component values have been used:

| | | |
|---|---|---|
| Lc = 1.2 mH | Cf = 6.8 nF | Ld = 110 $\mu$H |
| Cs = 390 nF | Cm = 47 nF | Rd = 7$\Omega$ |
| Cb = 1 $\mu$F | Lm = 10 $\mu$H | |

Lprimary of Tr1 = 1 mH
Turns ratio of Tr1 is 10 to 1.

Figure 4:
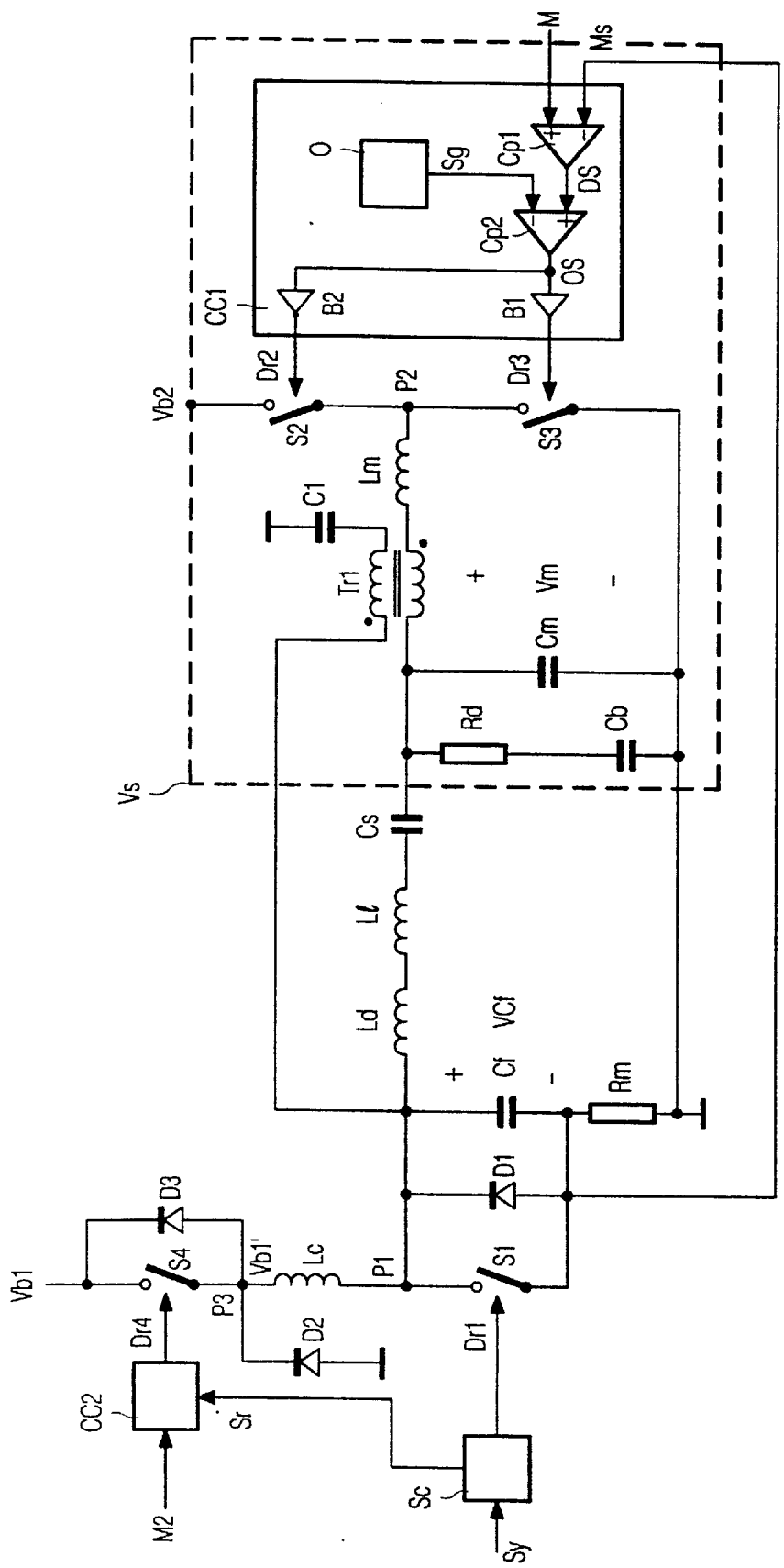
FIG. 4 shows a detailed block diagram of a further embodiment of the deflection circuit and the deflection correction circuit according to the invention.

FIG. 4 shows a detailed block diagram of a further embodiment of the deflection circuit and the deflection correction circuit according to the invention. This embodiment of the invention differs from the embodiment of FIG. 3 in that a feedback loop has been added. The same references denote the same elements as in FIG. 3. The current through the parallel arrangement of the switch S1, the diode D1 and the flyback capacitor Cf is measured with a resistor Rm connected between ground and a junction of switch S1, the diode D1, and the flyback capacitor Cf. A feedback voltage Ms is obtained across the resistor Rm.

The control circuit CC1 comprises a differential amplifier CP 1 with an inverting input receiving the feedback voltage Ms, and a non-inverting input receiving the modulating signal M. A comparator CP2 has a non-inverting input connected to an output of the differential amplifier CP1, an inverting input receiving an oscillator signal Sg from an oscillator O, and an output for supplying the drive signal Dr3 via a non-inverting buffer B1, and the drive signal Dr2 via an inverting buffer B2.

Figures 5A, 5B, 5C:
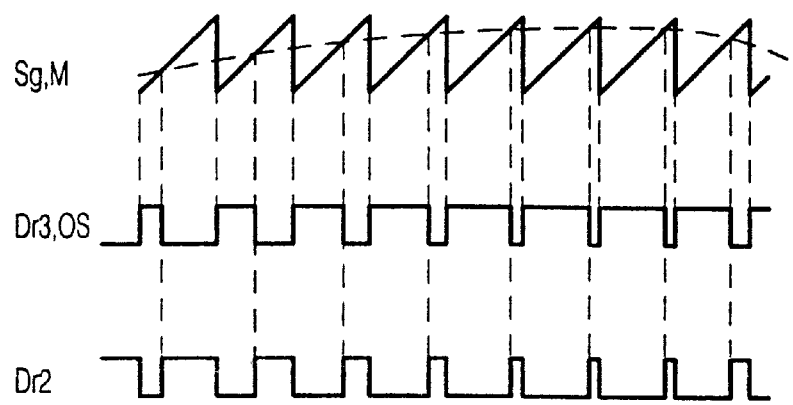
FIGS. 5A–5C show waveforms occurring in an embodiment of the correction circuit.

FIGS. 5A–5C show waveforms occurring in an embodiment of the correction circuit. FIG. 5A shows the oscillator signal Sg as a periodical sawtooth signal with a repetition frequency selected to be substantially higher than the line frequency. FIG. 5A further shows the modulating signal M as a dashed parabola-like waveform.

Let us consider the situation without feedback. The differential amplifier CP1 is superfluous and the modulating signal M is supplied to the non-inverting input of the comparator CP2. The comparator CP2 compares the actual value of the modulating signal M with the oscillator signal Sg to generate an output signal OS which has a high level as long as the oscillator signal SG has a value lower than the modulating signal M. The non-inverted output signal Dr3 controls the switch S3 and the inverted output signal Dr2 controls the switch S2. In this situation, a parabola-shaped modulating voltage Vm occurs across the modulator capacitor Cm when the modulating signal M is parabola-shaped. Special provisions may be needed to prevent that both the switches S2 and S3 are conducting at the same time.

Next, let us consider the situation with feedback. The differential amplifier CP1 controls the on and off times of the switches S2 and S3 via the comparator CP2, such that the voltage across the resistor Rm equals the shape of the modulating signal M. Thus, if an S-shaped deflection current Id is required, the modulating signal M should be S-shaped. Due to the feedback, again a parabola-shaped modulating voltage Vm occurs across the modulator capacitor Cm.

While the invention has been described in connection with preferred embodiments, it will be understood that modifications thereof within the principles outlined above will be evident to those skilled in the art and thus the invention is not limited to the preferred embodiments but is intended to encompass such modifications.

The choke coil Lc may be a transformer for example for generating the anode voltage of the cathode ray tube. Due to the modulation of the voltage across the primary of the transformer, stabilization of the anode voltage may be required.

The measurement of the current through the deflection coil Ld or the switch S1 may also be performed with a current transformer. The measurement resistor Rm or the current transformer may also be arranged in a position other than that shown in FIG. 4, as long as the current to be measured flows through it.

The modulating signal M may be generated by an analog or digital waveform generator, or by a suitably programmed microprocessor. User inputs may influence the modulating signal.

The feedback circuit may also be realized with digital circuits. For example, a central processing unit (CPU) receives the feedback voltage Ms via an analog to digital converter, supplies the input signal Ds for the comparator CP2 via a digital-to-analog converter and an optional low-pass filter. The CPU compares the feedback voltage samples with a desired waveform as stored in a memory to calculate difference values which are supplied to the digital to analog converter.

In conclusion, a preferred embodiment of the deflection circuit according to the invention comprises a deflection correction circuit (Vs) with a controllable active voltage source (Vs) arranged in a loop formed by a deflection coil (Ld), an S-capacitor (Cs), and a flyback capacitor (Cf). The voltage source (Vs) receives a further power supply voltage (Vb2) and a modulating signal (M) to supply a modulating voltage (Vm) varying in response to the modulating signal (M). The active voltage source (Vs) comprises a switching element (S2) which is switched on and off with a frequency which is substantially higher than the deflection frequency to possibilitate waveforms of the modulating voltage (Vm) with a frequency content which is substantially higher than the deflection frequency, so that any desired waveform can be generated within the deflection period (Td).

What is claimed is:

1. A deflection circuit for generating a deflection current through a deflection coil of a cathode ray tube, comprising:
   a series arrangement of a choke and a periodically switched electronic switch, the series arrangement being coupled to receive a power supply voltage;
   a diode and a flyback capacitor, each being arranged in parallel with said switch, the diode having a polarity so as to be conductive during at least part of a Lo period during which said switch is non-conductive;
   a series arrangement of the deflection coil and an S-capacitor arranged in parallel with the flyback capacitor; and a deflection correction circuit for generating a correction voltage across the deflection coil, characterized in that the deflection correction circuit comprises a controllable active voltage source arranged in the loop formed by the deflection coil, the S-capacitor, and the flyback capacitor for supplying a modulating voltage, said voltage source comprising a switching element for converting a further power supply voltage into the modulating voltage under control of a control signal determining periodically occurring on and off periods of the switching element, the control signal having a control switching period which is substantially shorter than a deflection switching period of said switch.

2. A deflection circuit as claimed in claim 1, characterized in that said voltage source comprises a modulator capacitor arranged in said loop, and a modulator coil arranged between the modulator capacitor and the switching element, values of the modulator capacitor and the modulator coil being selected to suppress a switching frequency of the switching element while substantially passing a deflection frequency and/or higher harmonics of the deflection frequency.

3. A deflection circuit as claimed in claim 2, characterized in that the deflection correction circuit comprises a further switching element arranged across the modulator capacitor and the modulator coil, the switching element and the further switching element being arranged in series between terminals of the further power supply voltage.

4. A deflection circuit as claimed in claim 2, characterized in that a damping resistor is coupled across the modulator capacitor.

5. A deflection circuit as claimed in claim 4, characterized in that a blocking capacitor is arranged in series with the damping resistor.

6. A deflection circuit as claimed in claim 2, characterized in that the deflection correction circuit further comprises a transformer having a primary winding coupled to receive a flyback pulse, and a secondary winding arranged in series with the modulator coil.

7. A deflection circuit as claimed in claim 2, characterized in that the deflection correction circuit further comprises means for measuring a current flowing through said switch or for measuring the deflection current, said current measuring means suppling a measurement signal to a control circuit, the control circuit comprising a comparing circuit for comparing the measurement signal with a modulating signal for adapting a duty cycle of the switching element, so that in a stable situation, the measurement signal is in accordance with the modulating signal.

8. A deflection circuit as claimed in claim 1, characterized in that the S-capacitor has a value to obtain a correct S-correction at a deflection frequency substantially in the middle of a frequency range in which the deflection circuit has to operate.

9. A deflection circuit as claimed in claim 1, characterized in that a linearity correction coil is arranged in series with the deflection coil, the linearity correction coil having a value to obtain a substantially correct linearity at a deflection frequency substantially in the middle of a frequency range in which the deflection circuit has to operate.

10. A display apparatus comprising:

a cathode ray tube; and a deflection circuit for generating a deflection current through a deflection coil arranged to deflect an electron beam in the cathode ray tube, said deflection circuit comprising:

a series arrangement of a choke and a periodically switched electronic switch, the series arrangement being coupled to receive a power supply voltage;

a diode and a flyback capacitor, each being arranged in parallel with said switch, the diode having a polarity so as to be conductive during at least part of a period during which said switch is non-conductive, a series arrangement of the deflection coil and an S-capacitor arranged in parallel with the flyback capacitor; and a deflection correction circuit for generating a correction voltage across the deflection coil, characterized in that the deflection correction circuit comprises a controllable active voltage source arranged in a loop formed by the deflection coil, the S-capacitor, and the flyback capacitor for supplying a modulating voltage, said controllable active voltage source comprising a switching element for converting a further power supply voltage into the modulating voltage under control of a control signal determining periodically occurring on and off periods of the switching element, the control signal having a control switching period which is substantially shorter than a deflection switching period of said switch.

* * * * *